(12) United States Patent
Merriam

(10) Patent No.: US 6,795,846 B1
(45) Date of Patent: Sep. 21, 2004

(54) NETWORK CONFIGURATION AND MANAGEMENT FOR DYNAMIC NETWORKS AND METHODS THEREOF

(75) Inventor: Charles Merriam, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/537,961

(22) Filed: Mar. 28, 2000

Related U.S. Application Data

(60) Provisional application No. 60/161,200, filed on Oct. 22, 1999.

(51) Int. Cl.$^7$ ............................................. G06F 15/16
(52) U.S. Cl. ........................ 709/203; 709/220; 709/222; 713/2; 713/201
(58) Field of Search ................................ 709/220, 222, 709/203; 713/2, 201

(56) References Cited

U.S. PATENT DOCUMENTS

| | | | |
|---|---|---|---|
| 5,894,479 A | * | 4/1999 | Mohammed ................ 370/401 |
| 6,003,097 A | * | 12/1999 | Richman et al. ................ 710/8 |
| 6,052,720 A | * | 4/2000 | Traversat et al. ............ 709/220 |
| 6,105,100 A | * | 8/2000 | Dean et al. .................. 710/220 |
| 6,108,779 A | * | 8/2000 | Dean et al. ..................... 713/2 |
| 6,385,648 B1 | * | 5/2002 | Philippou et al. ........... 709/222 |
| 6,389,030 B1 | * | 5/2002 | Coden .......................... 370/404 |
| 6,487,608 B2 | * | 11/2002 | Gifford et al. .................. 710/8 |

OTHER PUBLICATIONS

"JINI Network Technology", from Sun.com, Jan., 1999.*
Jini Network Technology, "Overview," www.sun.com/jini/overview/,Jan. 2000.
Jini Network Technology, White Papers and Other Documents, "Jini[tm] Technology Architectural Overview," www.sun.com/jini/whitepapers/architecture.html,Jan. 1999.

* cited by examiner

Primary Examiner—John Follansbee
Assistant Examiner—Jinsong Hu
(74) Attorney, Agent, or Firm—Beyer Weaver & Thomas LLP

(57) ABSTRACT

Methods, data structures and apparatus suitable for configuration and management of dynamic networks is disclosed. A dynamic network manager that can facilitate automatic configuration of a new device on the computer network is disclosed. The dynamic network manager can detect the presence of a new device by monitoring the transmitted information on the computer network. When the presence of a new device is detected, the dynamic network manager can use the address associated with the new device to lookup device related information such as device drivers. Device drivers can be installed by the dynamic network manager to configure the new device on the computer network without requiring significant human resources.

26 Claims, 5 Drawing Sheets

| Global Ethernet Address 402 | Proxy Flag 404 | Proxy Address 406 | Pointers to Device Drivers 408 | Device Driver Parameters 410 |
|---|---|---|---|---|
| Address-1 | | | | |
| ⋮ | | | | |
| Address-I | | | | |
| | | | | |
| Address-N | | | | |

Fig. 4

NETWORK CONFIGURATION AND
MANAGEMENT FOR DYNAMIC
NETWORKS AND METHODS THEREOF

This application claims the benefit of provisional application 60/161,200 filed Oct. 22, 1999.

FIELD OF THE INVENTION

The present invention relates generally to configuration and management of computer networks. More particularly, the present invention relates to methods, data structures and apparatus for configuration and management of dynamic networks without requiring significant amount of planning, installation, human intervention, and programming of the network devices.

DESCRIPTION OF THE RELATED ART

With the dramatic increase in both the popularity and complexity of computer networks, issues relating to formation, configuration and maintenance of computer networks have become increasingly important. In conventionally configured networks, management of the network requires substantial amount of planning, resources, and in most cases, some form of human intervention. For example, even the relatively simple task of configuring a printer on a computer network typically requires a network manager to intervene so as to identify and manually install the appropriate device drivers for that printer.

With these traditional manual approaches to network management, it is not feasible to implement dynamic network management strategies one of which is referred to as "spontaneous networking." As is well known in the art, spontaneous networking generally provides for devices that can be "plugged into" a computer network and be readily available for use without requiring a significant amount human intervention. Recently, there have been new developments in the field of network management. For example, Sun Microsystems's Jini connection technology, provides mechanisms that enable devices to plug together to form a computer network without requiring significant human intervention.

Unfortunately, these conventional dynamic network management techniques generally require intelligent devices (i.e., devices having both memory resources and processing power so that they can be programmed in order to operate effectively in a spontaneous network). The need to program these devices requires both programming time and programming resources. In addition to wasting valuable network resources, the requirement that each device be specially programmed adversely impacts the capability of the network to operate in a multi-platform environment since it may not feasible to program all devices according to a single standard.

In the view of the foregoing, there is a need for methods, data structures and apparatus for configuration and management of dynamic networks without requiring significant amount of planning, installation, human intervention, and programming of devices.

SUMMARY OF THE INVENTION

To achieve the foregoing and other objects and in accordance with the purpose of the present invention, methods, data structures and apparatus suitable for configuration and management of dynamic networks is disclosed. In accordance to one aspect of the invention a dynamic network manager is disclosed. In accordance to one embodiment of this aspect of the invention, a dynamic network manager that is a dynamic network manager is disclosed. The dynamic network manager can facilitate configuration of a new device on the computer network.

In one embodiment, the dynamic network manager can detect the presence of a new device by monitoring the transmitted information on the computer network. The dynamic network manager can detect the presence of a new device by monitoring addresses of the packets that are transmitted on the network.

In a preferred embodiment, a dynamic network manager suitable for use in an Ethernet Local Area Network is disclosed. When the presence of a new device is detected, the dynamic network manager can use the Ethernet address associated with the device to identify the device and lookup other device related information for the new device.

In another preferred embodiment, a dynamic network manager capable of configuring a new device on an Ethernet Local Area Network is disclosed. When the presence of a new device is detected, the dynamic network can obtain device drivers and other information necessary to configure the device.

In another embodiment, device drivers are installed by the dynamic network manager to configure the new device on the computer network without requiring significant human intervention.

BRIEF DESCRIPTION OF THE DRAWINGS

The invention, together with further objects and advantages thereof, may best be understood by reference of the following description taken in conjunction with the accompanying drawings in which:

FIG. 4 is a diagrammatic representation of a simplified repository of global Ethernet source addresses, in accordance to a particular embodiment of the present invention.

DETAILED DESCRIPTION OF THE INVENTION

This invention pertains to methods, data structures and apparatus suitable for configuration and management of dynamic networks. In one aspect, this invention relates to a dynamic network manager that can configure a new device on the computer network without requiring significant amount of planning, installation, human intervention, and programming of devices on the computer network.

In accordance with one embodiment of the invention, the dynamic network manager is capable of identifying and appropriately configuring a new device. In the case where the device is initially unidentified, the network dynamic manager is arranged to provide the appropriate device configuration data. In this way, devices can be plugged into the network without committing substantial amounts of time and/or resources to programming these devices.

In addition, in contrast to conventional approaches to network device management, the devices need not be intelligent devices thereby substantially improving the potential network performance as well as reducing the complexity and overall cost of implementing a computer network.

Embodiments of this aspect of the invention are discussed below with reference to FIGS. 1–5. However, those skilled in the art will readily appreciate that the detailed description given herein with respect to these figures is for explanatory purposes as the invention extends beyond these limited embodiments.

In accordance to one embodiment of this aspect of the invention, the dynamic network manager detects the presence of a new device by monitoring associated transmitted information on the computer network. In a particular embodiment, the dynamic network manager detects the presence of a new device by monitoring addresses of data packets that are transmitted on the computer network.

Figure 1:
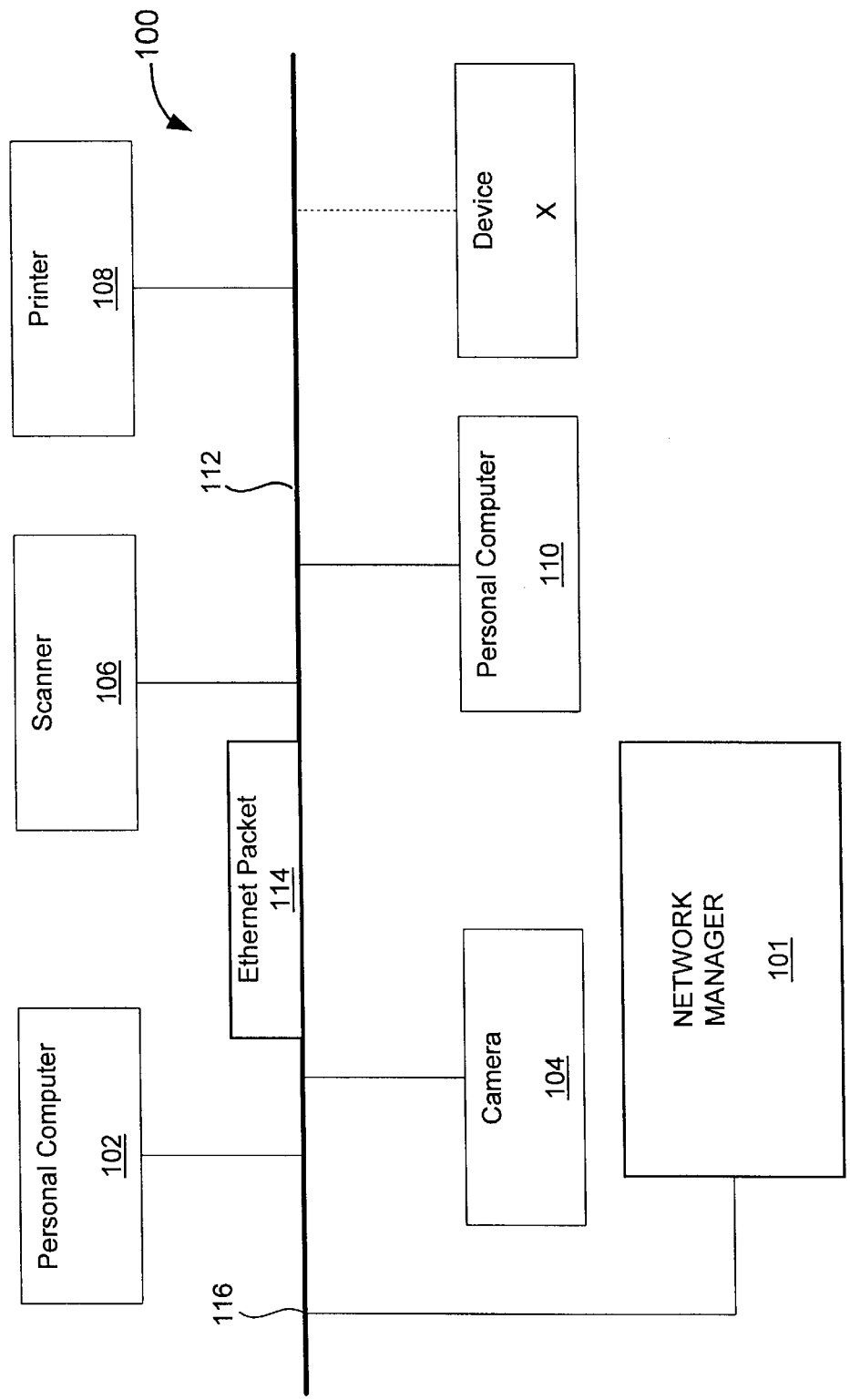
FIG. 1 provides an example of a computer network having a dynamic network manager in conjunction with one embodiment of the present invention.

To facilitate understanding, FIG. 1 provides an example of a computer network 100 having a dynamic network manager 101 in accordance with one embodiment of the present invention. It should be noted that the computer network 100 is representative of a wide variety of different computer networks. For example, the computer network 100 can be either a Wide Area Network (WAN) or a Local Area Network (LAN) either of which can support several different high level protocols such as OSI, SNA, TCP as well as lower level protocols such as, for example, Token Ring, Token Bus, Ethernet, FDDI, and so forth. Typically, several network components are interconnected to form the computer network 100 via a physical medium. For an example, a sample network of components are depicted in FIG. 1 as different devices that are interconnected to form the computer network 100. As shown in FIG. 1, these devices may include a personal computer 102, a digital camera 104, a scanner 106, a printer 108, and a personal computer 110.

Devices 102–110 are connected together via a physical medium 112 such as, for example, a coaxial cable. As another example, in the case where the computer network 100 takes the form of an Ethernet LAN type network, the physical medium 112 might be a "thin" or a "thick" Ethernet coaxial cable. In any case, the physical medium 112 interconnects devices 102–110 together to facilitate transfer of information between the devices 102–110. For example, information on the personal computer 102 can be transmitted over the coaxial cable 112 to be printed on the printer 108.

As it is well known to those skilled in the art, devices without any memory or processing power can be controlled by another piece of hardware and/or software, commonly referred to as a proxy. In a similar manner, the network manager 101 can control devices that do not have any memory or processing power. It should also be noted that network manager 101, can encompass hardware as well as software pieces.

Moreover, dynamic network manager 101 detects the presence of a new device "X" by monitoring the associated transmitted information on the computer network 100, and, if desirable, configures the new device without requiring significant human intervention. By way of example, the new device X is detected and identified as a particular type of device (e.g., printer, scanner, camera, personal computer, HP Laserjet 3 printer) based on a unique network address that corresponds to the new device. The unique network address is transmitted over the computer network 100. In addition, in accordance to a preferred embodiment, other information necessary to configure the new device (e.g., device drivers for a particular make and model of the device) can be identified to facilitate automatic configuration of the device on the network.

By providing the appropriate configuration data, such as a required device driver, the dynamic network manager 101 does not require the devices on the network to act as intelligent devices. Thus, devices can be plugged into the computer network without devoting significant time and resources to programming devices (i.e., device need not be or act as "intelligent" devices). It should be noted that although only one dynamic network manager 101 is depicted in FIG. 1, a plurality of dynamic network mangers can be connected to the computer network 100. For example, the plurality of dynamic network mangers can coexist in a distributed environment wherein each of the dynamic network mangers provides at least a portion of services provided by the dynamic network manager 101 described above.

To facilitate further understanding, the operation of the dynamic network manager 101 will be discussed with respect to an Ethernet local area network (Ethernet LAN). It should be noted that the description of the Ethernet LAN network is for illustrative purposes only and should not be considered to limit the scope of the invention. By way of example, computer network 100 can be an Ethernet LAN that connects Ethernet devices 102–110 through an Ethernet coaxial cable 112. Devices 102–110 can communicate which each other by transmitting and receiving information that travels on the Ethernet coaxial cable 112.

In an Ethernet LAN environment, data is transmitted in the form of one or more Ethernet packets (Data-Grams). FIG. 1 depicts an Ethernet packet 114 that is being transmitted over the Ethernet coaxial cable 112. In addition to data, the Ethernet packet 114 contains Ethernet addresses of both the sender and the receiver of the packet. As it is well known in the art, when configured as an Ethernet LAN type network, each of the network (Ethernet) devices 102–110 have been assigned a unique Ethernet device (station) address that is used to facilitate communication between different devices on the network. The Ethernet addresses are generally globally unique and assigned at time of device manufacture.

Using this addressing scheme, for example, a device such as personal computer 102 can send information (data) to another device such as a printer 108. By way of example, an Ethernet packet sent by personal computer 102 to printer 108 includes an address (source address) that identifies personal computer 102 as the sender and an address (destination address) that identifies printer 108 as the receiver of the Ethernet packet.

Figure 2:
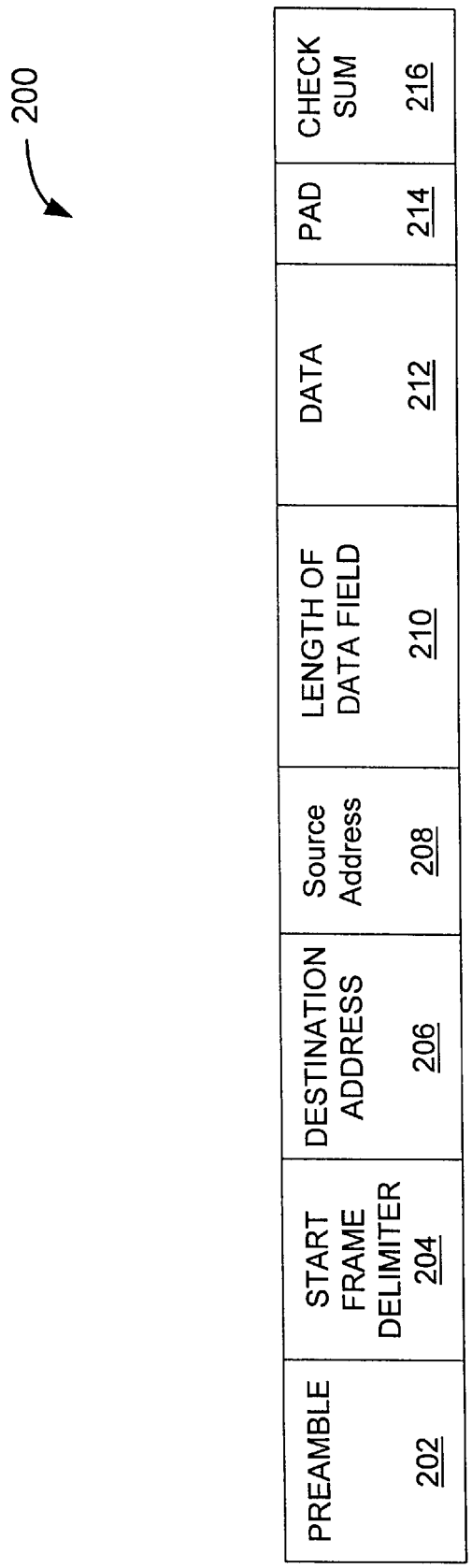
FIG. 2 depicts a diagrammatic representation of a typical Ethernet packet.

To better illustrate the addressing scheme of an Ethernet LAN, FIG. 2 depicts a diagrammatic representation of a typical Ethernet packet 200. Ethernet packet 200 can be an Ethernet packet travelling on an Ethernet LAN network such as, for example, the Ethernet packet 114 as depicted in FIG. 1. The Ethernet packet 200 generally includes a "preamble" 202 that is typically 8 bytes long. The last byte in the preamble is a "start frame delimiter" 204. After the "start frame delimiter" byte, a "destination address" 206 is used to identify the address of the receiver of the Ethernet packet. "Destination address" 206 is typically 6 bytes long. Similarly, typically a 6 bytes long "source address" 208 indicates the address of the sender of the Ethernet packet. The "length of data field" 210 (typically 2 bytes) is generally used to indicate the length of "data" 212 (typically 0–1500 bytes) that follows. Other information such as "pad" 214 and "checksum" 216 are typically included.

It should be noted that in many applications a data bit 46 (adjacent to the high-order bit) of the destination address 206 and/or source address 208 is used to distinguish local addresses from global addresses. In the described embodiment, local addresses are typically assigned by a local network administer and have no significance outside the local network. In contrast, global addresses are assigned by IEEE to ensure that no two Ethernet devices (stations) in the computer network 100 or in the entire world for that matter have the same global address. In this way, any Ethernet device (station) is capable of uniquely addressing any other Ethernet device (station) by assigning the proper 48-bit number.

In order to utilize this global addressing scheme, in a preferred embodiment, the network manager 101 monitors global Ethernet addresses of Ethernet packets that are transmitted over the network 100 in order to detect a device address. Once the device address is detected, the network manager 108 determines whether the device associated with the detected address is known to the network. In the case where the device X has been recently connected to the network 100, the network manager 101 will most likely not recognize the device X and will therefore consider device X to be an unknown device.

As an example, the dynamic network manager 101 can be connected to the Ethernet coaxial cable 112 in a manner that any Ethernet packets traveling through a point 116 on the computer network 100 can be monitored (also referred to as being sniffed). By monitoring an Ethernet packet, the network manager 101 can determine the global source address of the sender of the packet. This global source address can be searched in a table of known network addresses that is generated and maintained by the network manager 101. In the case where the detected global source address is not found in the table of known network addresses, the sending device is considered to be an unknown device such as the new device X that has been recently plugged into the Ethernet LAN.

Since the dynamic network manager 101 can monitor (sniff) the information without interfering with the transmission of information and/or introducing a point of failure to the computer network, network performance is substantially unaffected.

In accordance to another embodiment of the present invention, when the presence of a new device has been detected on the computer network 100, the dynamic network manager 101 can look up and obtain necessary information, such as configuration data that is used to configure the new device X on the Ethernet LAN 100. This configuration data can, and usually does, include device type, device driver parameters, as well as the location of the device drivers. To facilitate spontaneous networking, the new device X can be configured using the device-related information that is obtained by the dynamic network manager 101.

Figure 3:
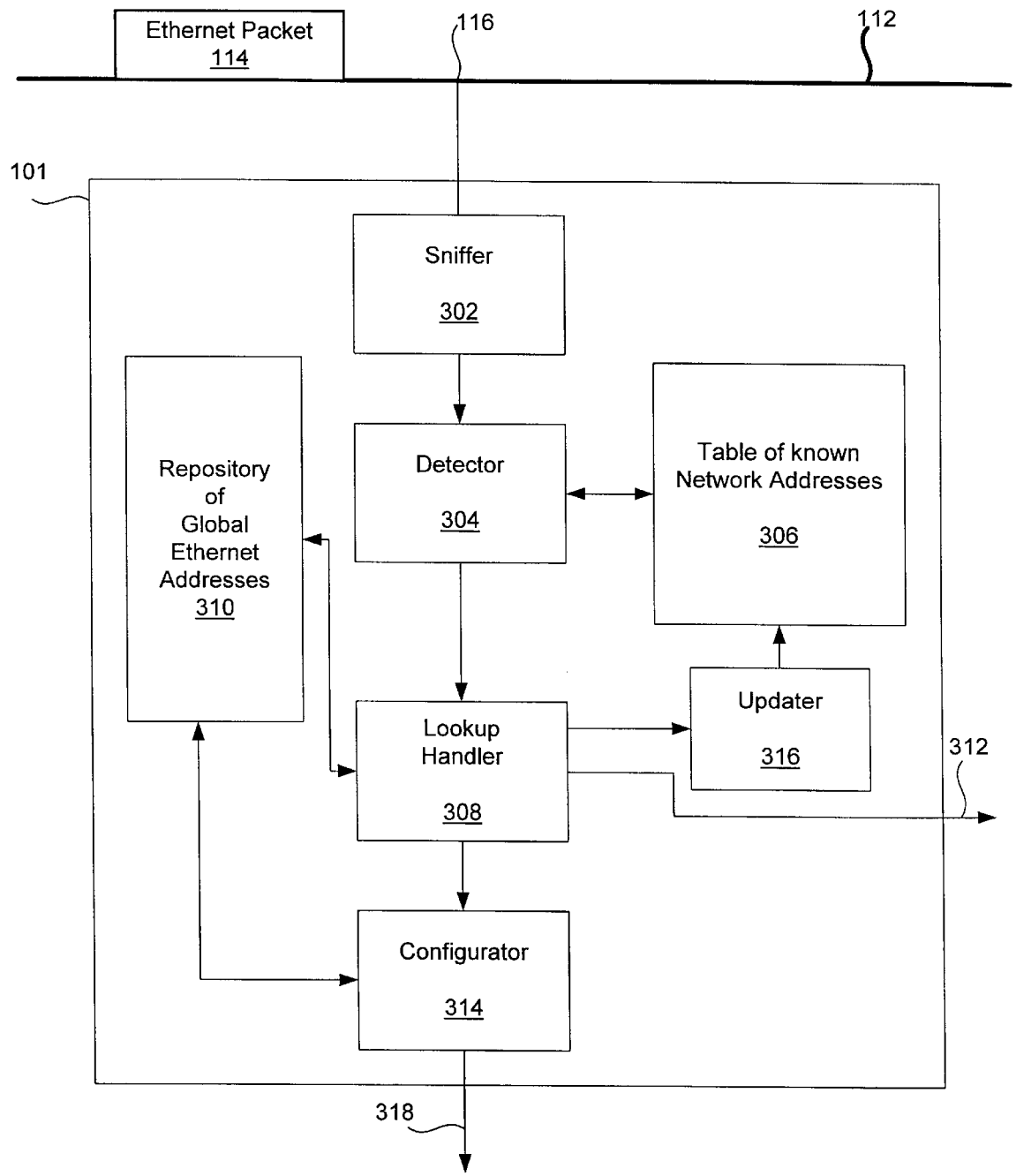
FIG. 3 provides a dynamic network manager in conjunction with a preferred embodiment of the present invention.

In accordance to a preferred embodiment of the present invention, FIG. 3 illustrates a particular implementation of the dynamic network manager 101. In the described implementation, the network manager 101 is connected to the computer network 100 via the Ethernet coaxial cable 112. The dynamic network manager 101 is also connected at the point 116 so that it can monitor the transmission of an Ethernet packet, such as Ethernet packet 114 being transmitted on the computer network 100 via the Ethernet coaxial cable 112. More specifically, a sniffer 302 included in the dynamic network manager 101 monitors the Ethernet coaxial cable 112 to detect the transmission of the Ethernet packet 114 on computer network 100.

As mentioned earlier, the Ethernet packet 114 can be a packet that was sent from a particular device on the computer network 100 to another device on the computer network 100 (i.e., an Ethernet packet that was sent from a device such as personal computer 102 to another device such as a printer 108). In addition to data, the Ethernet packet 114 contains Ethernet addresses of both the sender and the receiver of the packet. By way of example, an Ethernet packet sent by personal computer 102 to printer 108 includes an address (source address) that identifies personal computer 102 as the sender and an address (destination address) that identifies printer 108 as the receiver of the Ethernet packet.

It should be noted that the sniffer 302 monitors the Ethernet packets on the computer network 100 without introducing a new point of failure to the computer network 100. In addition, more than one sniffer may be employed to increase the fault tolerance of the dynamic network manager 101. For example, one or more sniffers can serve as a back-up system that starts monitoring the computer network 100 when a main sniffer encounters operational difficulties. Alternatively, as another example, several sniffers may be employed simultaneously to monitor the computer 100 network in parallel.

As discussed earlier, using the addressing scheme of the Ethernet LAN (computer network) 100, the dynamic network manager 101 detects the presence of a new device that has not been configured on the computer network 100. More specifically, sniffer 302 sniffs the Ethernet packet 114 to duplicate (i.e., make a copy without interfering or modifying) the source and destination addresses that are found in the Ethernet packet 214. However, it should be noted that global Ethernet destination addresses can also be used to detect the presence of a new device on the network. In addition, although in this preferred embodiment global address are utilized, it should be understood that local addressing schemes (i.e., addresses that are assigned and defined only locally, typically by a system administer) can also be used without departing from the scope and spirit of this invention.

It should also be borne in the mind that although for illustration purposes this particular embodiment has been discussed with reference to an Ethernet LAN, the present invention can be embodied to take advantage of a wide variety of addressing schemes that are used on other types of computer networks. As it is well known in the art, especially with respect to packet-switching networks, typically packet traveling on a network have a source and/or a destination address that uniquely identify a source and/or a destination device respectively. This information typically travels in the form of data packets that can be monitored by sniffer 302. For example, other LAN's with addresses that can be monitored by sniffer 302 in a similar manner as disclosed with respect to Ethernet addresses include Token Bus, Token Ring, FDDI, and so forth.

After the sniffer 302 sniffs the Ethernet packet 114, it passes the duplicated global Ethernet source address 303 to a detector 304. The detector 304 determines whether the global Ethernet source address 303 is known by the network 100 (i.e., whether the device represented by the global Ethernet source address has been configured on the computer network 100). In one embodiment, the detector 304 searches a table of known network addresses 306. As it is well known in the art, the table of known network addresses 306 can be created and maintained to represent the addresses corresponding to the devices that are known to the network (i.e., have already been configured). A wide variety of data structures and methods are available to implement the table of known addresses 306. For example, the table of known network addresses 306 can be implemented as a linked list with the addresses arranged in an ascending order. In addition, the list of known addresses can be searched by detector 304 by a wide variety of well-known search algorithms using the global Ethernet source address 303 as the key.

If the detector 304 finds the global Ethernet source address 303 is in the table of known network addresses 306, then this address and the Ethernet packet 114 can be effectively ignored. However, if the detector 304 does not find the global Ethernet source address 303 in the table of known network addresses 306, then the global Ethernet source address 303 can be passed to a lookup handler 308. It should be noted that if detector 304 does not find the global Ethernet source address 303 in the table of known network addresses 306, the presence of a new device (i.e., not configured) on the network 100 could be suspected.

In the case when the detector 304 does not find the global Ethernet source address 303 in the table of known network addresses 306, the look-up handler 308 can attempt to obtain information relating to the global Ethernet source address 303. In this case, detector 304 outputs the global Ethernet source address 303 as input to the look-up handler 308. The look-up handler 308 can determine whether any information regarding the device represented by the global Ethernet source address is available. In addition, The look-up handler 308 can retrieve any existing information that may be associated with the global Ethernet source address 303. In one embodiment, the look-up handler 308 searches a repository of global Ethernet addresses 310 using the global Ethernet source address 303 as the key. As it will be illustrated with respect to FIG. 4, the information relating to an Ethernet device may be collected and maintained in a repository 310.

FIG. 4 is a diagrammatic representation of a simplified repository of global Ethernet addresses 310 in accordance to a particular embodiment of the present invention. In column 402, the global Ethernet addresses are listed. The list of addresses in column 402 can be searched for a particular address to lookup device related information for the corresponding device. The device-related information is listed in columns 404–410.

As depicted in FIG. 4, repository 310 can include device related information such as proxy flags 404, proxy addresses 406, pointers to device drivers 408, and device driver parameters 410. Proxy flags 404 can be utilized to indicate whether a particular device should be configured or effectively ignored. This is done because in certain situation it may not be necessary to control a particular device. For example, if a device is an intelligent device (e.g., fully enabled JINI device,) it may not be desirable to control and/or configure that device. However, if it is desirable to control and/or configure a device, the corresponding proxy flag 404 can be set. A proxy address for the device can be kept in column 406. This Proxy address can be different than the Global Ethernet address. Higher layer protocols (e.g., Jini discovery, join, and lookup protocols) may use this proxy address to communicate with the higher layer protocols that are supported on the device. Other device related information such as pointers to device drivers 408, and device driver parameters 410 can also be maintained to facilitate configuration of a device on the network.

By checking the repository of global Ethernet addresses 310, the look-up handler 308 can determine whether any information relating to a device represented by the global Ethernet address 303 is available. In addition, the look-up handler 308 can retrieve any desirable information from the repository of global Ethernet addresses 310 and output the information as an output 312. The output 312 can be used by a wide variety of network management and configuration applications. As an example, lookup handler 308 can pass the device type (e.g., a printer, scanner, personal computer, camera) of the device associated with the global Ethernet address 303. The information outputted as 312 can be used, for example, by a network management application to keep track of the number of printers the are configured on the network.

Furthermore, look-up handler 308 can decide whether the particular device associated with the global Ethernet address 303 should be configured on the computer network 100. As it is well known to those skilled in the art, the logic regarding this decision can be implemented by a wide variety of methods that can be embodied in software and/or hardware pieces. As a simple example, an entry in the repository of the global Ethernet addresses 310 can be added to indicate whether a particular device should be configured on the network 100 (i.e., a configure flag in the repository 310 for the computer network 100 that can be set to true or false). As another example, the logic regarding the decision whether to configure a particular device on the network 100 can be implemented with a relatively sophisticated embodiment of hardware and/or software pieces that consider several factors to determine whether a particular device should be configured If the decision is made to configure the device represented by the global Ethernet source addresses 303, then the look-up handler 308 can pass the information necessary to configure the device to a configurator 314. This information, for example, can include the device drivers, device driver parameters, and other device related information that may be necessary to configure the device represented by the global Ethernet source addresses 303. It should be noted that look-up handler 310 can provide the configurator 314 with a copy of the information necessary to configure a device. Alternatively, only information necessary to obtain the material (e.g., pointers to the information) can be passed to configurator 314. In this case, configurator 314 can directly obtain the material from the repository of Ethernet addresses 310 by using the information that was provided by lookup handler 308.

Configurator 314 can use the device-related information to configure the device associated with the global Ethernet source address 303. For example, the configurator 314 can install the device drivers with the appropriate device driver parameters on the network 100. The configurator 314 can output information necessary to configure the device associated with global Ethernet source address 303 as an output 318. The output 318 may travel on the network 100 to facilitate configuration of the device. For example, this information (output 318) may be packed as Ethernet packages that travel on Ethernet coaxial cable 112.

After a particular device has been configured Look-up handler 308 can also output the global Ethernet source address 303 to an up-dater 316. The up-dater 316 can update the table of known network addresses 306 to add the new address to the network 100 (i.e., the addresses representing the device that is now configured on the network).

As mentioned earlier, the device represented by global Ethernet source address 303 is typically a device that has been recently connected (plugged in) to the network. In this manner, the dynamic network manager 101 can automatically detect the presence of a recently connected device on the computer network 100. In addition, as disclosed with respect to FIG. 3, dynamic network manager 101 can provide a wide variety of network management and configuration applications. For example, a recently connected device can automatically be configured on the computer network 100 without requiring a significant amount of human resources and/or intervention. In addition, in accordance to an embodiment of the present invention, the dynamic network manager 101 facilitates automatic configuration of newly connected devices without requiring a significant amount of programming of the devices.

For ease of illustration dynamic network manager 101 has been represented as including several components such as sniffer 302, detector 304, lookup-handler 308, configurator 314, and up-dater 316. However, it should be apparent that the dynamic network manager 101 can be represented in many other specific forms without departing from the scope of the invention. By way of an example, lookup-handler 308 may be divided into several distinct components. As another example, up-dater 316 may be combined with look-up handler 308.

Figure 5:
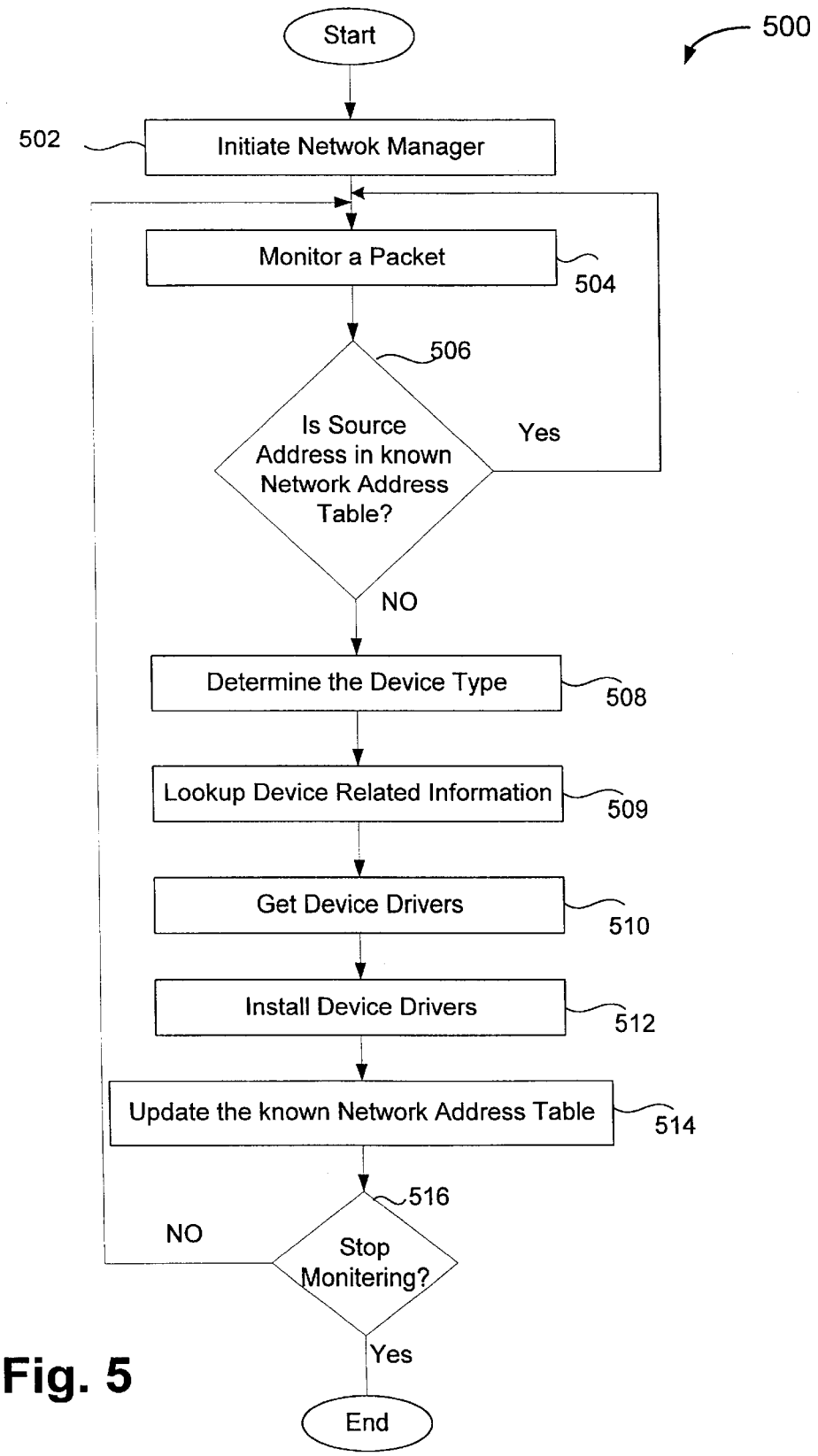
FIG. 5 is a flow diagram illustrating, in accordance to one preferred embodiment of the present invention, a method of configuring a new device to facilitate spontaneous networking on an Ethernet Local Area Network.

FIG. 5 is a flow diagram illustrating, in accordance to one embodiment of the present invention, a method 500 of configuring a new device to facilitate spontaneous networking on an Ethernet LAN. Dynamic network manager is initiated at operation 502. At operation 504, an Ethernet packet that is transmitted through the network is monitored to detect its source address. As discussed above, the source address can indicate which device has transmitted this packet. Next, at operation 506, a decision is made as to whether the source address detected at operation 504 is in a known network address table. As will be appreciated by those skilled in the art, the known network address table can be implemented in a variety of different ways and can be searched by a variety of known algorithms. For example, this table can be implemented as a simple linked list that is searched sequentially to determine whether a particular address is known to the network. If the source address is in the known network address table, then monitoring of another packet can be resumed. In the alternative, If the source address is not in the known network address table, presence of a new device is detected and the method 500 can proceed to operation 508.

Based on this source address, the device related information necessary to identify and configure the new device is looked up at operation 508. For example, this information can include device type, and other device related information such as device driver parameters and pointers. As mentioned above, a device on an Ethernet LAN network can be identified based on the unique Ethernet address assigned to it. In one embodiment, device related information is maintained in a repository that can be accessed by the lookup operation as noted in operation 508. Device related information can be looked up based on the source address that was monitored at operation 504.

As is known to those skilled in the art, a wide variety of lookup strategies may be utilized. For example, this repository can be implemented as a table that is kept on a storage device or a complex multi-layer database that is distributed throughout a computer network. Device related information such as device drivers can reside in the repository itself. Alternatively, device drivers and other device related information may be maintained outside of the repository and the repository may contain the information necessary to acquire the device drivers. Next, at operation 509, the device type is determined based on the device related information lookup at operation 508. The device type and possibly other information determined at operation 508 can be used to acquire device drivers at operation 510. Device drivers that have been acquired are then installed at operation 512 to configure the newly detected device on the network. After installation of device drivers at operation 512, the known network address table is updated at operation 514 to include the source Ethernet address for the newly configured device. Next, at operation 516 a determination is made as to whether the network manager should continue monitoring the network. If it is determined at operation 504 that the network manager should continue to monitor the network, the method 500 proceeds back to operation 504 where another packet is monitored. On the other hand, if it is determined at operation 504 that the network manager should not continue to monitor the network, the method 500 ends.

Although only a few embodiments of the present invention have been described, it should be understood that the present invention may be embodied in many other specific forms without departing from the spirit or scope of the invention. By way of example, although method 500 has been set forth in terms of a particular sequential order for the purposes of this explanation, it should be apparent that in many cases the ordering is not critical. For example, updating the known network address table can be done prior to installation of device drivers. Some operations may be combined or eliminated and others may be parsed into multiple operations. For example, looking up device related information (represented as 508) can be implemented as a series of multiple operations. As another example, operations represented as 510 and 512 may be eliminated since in some cases acquisition and installation of device drives may not be desirable. The same functionality can also be obtained using different operations as well.

Further, various tables have been described as having particular data structures, however, some of the described fields may be eliminated in some embodiments, and other fields may be added. For example, proxy address fields in table 400 could be readily eliminated. Additional information could also be added to table 400. For example, information relating to higher layer protocols supported by the device can be readily added. In addition, the present invention may be employed to gather and maintain device related information to facilitate a variety other applications, such as security and monitoring of computer networks.

In accordance to one aspect, the present invention has been described to enable those skilled in the art to take advantage of addressing features generally prevelant in most computer networks to facilitate network configuration and management for a variety of applications such as spontaneous networking. In a preferred embodiment, the present invention has been described in relation to globally unique addresses such as global Ethernet addresses. However, it will be apparent to those skilled in the art that the present invention can also be employed for computer networks that utilize local addressing schemes. Therefore, the present examples are to be considered as illustrative and not restrictive, and the invention is not to be limited to the details given herein, but may be modified within the scope of the appended claims.

What is claimed is:

1. A method of spontaneously networking to configure a device newly added to a network, the method comprising:
   providing a repository comprising a plurality of device addresses, wherein each device address is associated with appropriate device configuration information;

monitoring the network to detect the transmission of a packet on the network;

determining that a new device has been added to the network based on the monitoring of the network;

identifying the new device based on a source address of a packet transmitted on the network by the new device;

looking up appropriate device configuration information in the repository based on the identity of the new device;

obtaining device configuration information for the new device based on the looking up in the repository; and configuring the device to operate on the network by using the device configuration information obtained during the looking up in the repository.

2. The method of claim 1, wherein the source address is a global Ethernet source address.

3. The method of claim 1, wherein the device configuration information obtained is a device driver.

4. The method of claim 3, wherein the obtaining of the device driver for the new device is done by a JINI look-up service and the JINI look-up service communicates with the new device using a JINI protocol.

5. The method of claim 3, wherein the obtaining of the device driver for the new device is done by searching a distributed database on the Internet.

6. The method of claim 1, wherein the packet is a data-gram.

7. The method of claim 1, wherein the source address is a MAC address.

8. The method of claim 1, wherein looking up device information is done by searching a distributed database.

9. The method of claim 1, wherein the source address is a global Ethernet source address.

10. The method of claim 1, wherein the device configuration information obtained is a device driver.

11. The method of claim 1, wherein the obtaining of the device driver for the new device is done by a JINI look-up service and the look-up service communicates with the new device using a JINI protocol.

12. The method of claim 1, wherein the obtaining of the device driver for the new device is done by searching a distributed database on the Internet.

13. The method of claim 1, wherein the determining that a new device has been added to the network is accomplished by determining whether the monitored information has a network address that is associated with a device that is not configured on the computer network.

14. The method of claim 13 further comprising looking up device related information based on the network address associated with the device.

15. In a computer network, a dynamic network manager for obtaining device information relating to a device located on a computer network, comprising:

a repository that is connected to said computer network, said repository comprising a plurality of device addresses, each device address being associated with appropriate device configuration information:

a sniffer that is connected to said computer network, said sniffer monitoring a packet that is transmitted on the computer network, said packet having a source address, said sniffer outputting said source address; and a detector that is connected to the sniffer, said detector receiving said source address to determine whether the packet was transmitted from a source device on the network that was unknown to be on the computer network;

a look-up handler, said lookup handler looking up device information associated with the source device based on the source address of the packet.

16. The dynamic network manager of claim 15, wherein said look-up handler looks up device information associated with the source device using a JINI look-up service and the JINI look-up service communicates with the source device using a JINI protocol.

17. The dynamic network manager of claim 15, wherein said dynamic network manager further comprises a configurator, said configurator receiving device related information to configure a new device on said computer network using said device related information.

18. The dynamic network manager of claim 17, wherein the device information associated with the source device includes a device driver for the source device, said configurator installing the device driver for the source device to configure the source device on the computer network.

19. The dynamic network manager of claim 15, wherein the source address is a global Ethernet source address.

20. A computer readable medium including computer program code for spontaneously networking to configure a device newly added to a network, the computer readable medium comprising:

computer program code for providing a repository comprising a plurality of device addresses, wherein each device address is associated with appropriate device configuration information;

computer program code for monitoring the network to detect the transmission of a packet on the network;

computer program code for determining that a new device has been added to the network based on the monitoring of the network;

computer program code for identifying the new device based on a source address of a packet transmitted on the network by the new device;

computer program code for looking up appropriate device configuration information in the repository based on the identity of the new device;

computer program code for obtaining device configuration information for the new device based on the looking up in the repository; and computer program code for configuring the device to operate on the network by using the device configuration information obtained during the looking up in the repository.

21. The method of claim 20, wherein the packet is a data-gram.

22. The method of claim 20, wherein the source address is a MAC address.

23. The method of claim 20, wherein looking up device information is done by searching a distributed database.

24. The method of claim 20, wherein the source address is a global Ethernet source address.

25. The method of claim 20, wherein the device configuration information obtained is a device driver.

26. The method of claim 20, wherein the obtaining of the device driver for the new device is done by a JINI look-up service and the JINI look-up service communicates with the new device using a JINI protocol.

* * * * *

UNITED STATES PATENT AND TRADEMARK OFFICE
CERTIFICATE OF CORRECTION

PATENT NO. : 6,795,846 B1
DATED : September 21, 2004
INVENTOR(S) : Charles Merriam It is certified that error appears in the above-identified patent and that said Letters Patent is hereby corrected as shown below:

Column 11,
Line 37, change "look-up service" to -- JINI look-up service --.

Signed and Sealed this

Twenty-fifth Day of January, 2005

JON W. DUDAS
*Director of the United States Patent and Trademark Office*